(Specimens.)
J. A. H. HASBROUCK.
PROCESS OF AGING LIQUORS.
No. 418,792. Patented Jan. 7, 1890.
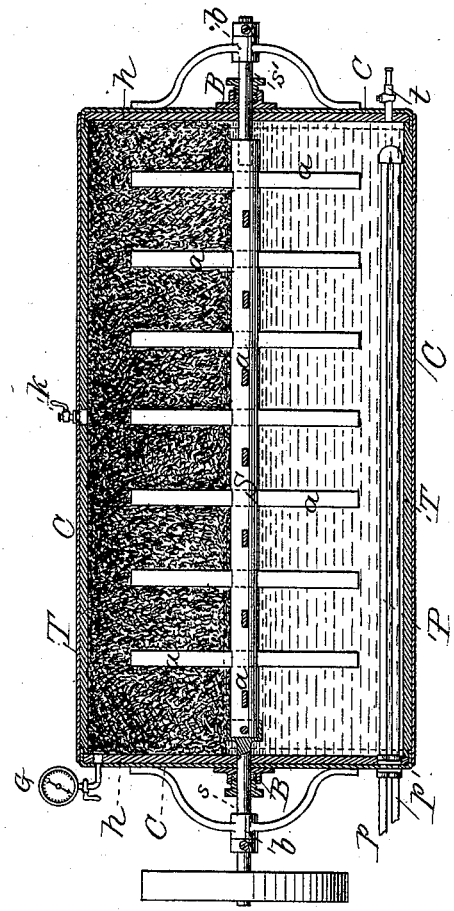

UNITED STATES PATENT OFFICE.

JULIAN A. H. HASBROUCK, OF PLAINFIELD, NEW JERSEY, ASSIGNOR TO THE NEW YORK AND NEW JERSEY LIQUOR MATURING COMPANY, OF SAME PLACE.

PROCESS OF AGING LIQUORS.

SPECIFICATION forming part of Letters Patent No. 418,792, dated January 7, 1890.

Application filed November 22, 1888. Serial No. 291,605. (Specimens.)

*To all whom it may concern:*

Be it known that I, JULIAN A. H. HASBROUCK, of Plainfield, in the county of Somerset and State of New Jersey, have invented a new and useful Process of Aging Liquors, of which the following is a specification.

This invention has reference to spirituous or alcoholic liquors (brandy, gin, whisky, &c.,) and to means of improving the quality of the same, when newly distilled, by artificially producing the ripening and mellowing effects, termed "aging," which are naturally attained by keeping such liquors many years.

Processes and other means of artificially aging liquors are not unknown; but prior to my invention liquors treated for that purpose by any of the processes with which I am familiar have either been positively injured by the elimination of part or all of their vital constituents or, in some instances, by the decomposition of the liquor and the destruction or conversion into other materials of the elements of the liquor; but in many cases no appreciable change—certainly no great improvement—in the quality of the liquor has been observable after the treatment.

The object of my invention is to improve alcoholic or spirituous liquors and produce the effect known as "aging" by artificial means without depriving the liquor of any of its constituent elements or deteriorating the quality thereof.

To this end my invention consists in artificially aging alcoholic or spirituous liquors by heating the same, subdividing, breaking up, or converting the liquor into a spray or vapor and subjecting it while in the condition of a spray or vapor to the action of atmospheric air or oxygen gas.

In the accompanying drawing is illustrated an apparatus for operating my improved process of aging liquors.

The said apparatus consists of a cylindrical air-tight tank or vessel T, made of a suitable wood, (oak, for example,) and having its end closed by heads $h\ h$. The inside surface of the vessel is charred or carbonized, or lined with charcoal, if preferred. No part of the wood of the vessel that the liquor comes in contact with should be left uncharred or uncarbonized, because the acids of the wood would be extracted and absorbed by the liquor, and thereby its flavor would be destroyed or injured to such an extent as to render the liquor valueless. The carbonized surface of the tank or vessel is represented in the drawing by stippling. The tank or vessel is preferably inclosed in a jacket or casing C, of boiler-iron. In the heads are stuffing-boxes B B, of copper. Gudgeons $s\ s'$, of copper, are passed through the said stuffing-boxes and coupled to the ends of a wooden shaft S, said shaft being provided with paddles or sprayers $a$. The gudgeons are held in bearings $b\ b$ outside of the vessel, and the openings in the heads of the tank or vessel through which they pass are kept tight by means of the packing in the stuffing-boxes. The vessel is provided with suitable means for heating the liquor. In the present instance I prefer to use the heat from steam, and for this purpose a U-shaped pipe P is placed inside the vessel near the bottom, both ends of said pipe being carried through the same head, and one branch $p$ connects with the exhaust-pipe of an engine or other suitable steam-supply, and the other branch $p'$, that carries off the water resulting from condensation, may be connected with any suitable reservoir or drain. The vessel is also fitted with a pressure-gage G, a cock $k$ at the top, and a tap $t$ in one head, near the bottom, the latter being arranged to connect by means of a pipe (flexible or rigid) with an air-pump, if atmospheric air is employed, or, if oxygen gas is to be used, then with a reservoir containing said gas under pressure.

With an apparatus such as I have above described the process of aging alcoholic liquors is as follows: The tank being a little more than half filled with the new liquor and the cock $k$ closed, steam is admitted to the pipe P, and a rotary motion is given to the shaft S by means of a belt running over a pulley on the gudgeon $s$. The temperature of the liquor is raised to about 100° Fahrenheit and maintained at that point. The paddles revolving through the body of the liquor keep it agitated, and they also lift it up and dash it against the upper part of the tank. Thereby the liquor is broken up and it falls through the atmosphere of air or gas in the upper part of the tank in the form of spray or vapor. The air or gas in the course of a few days becomes vitiated by the elimination of the oxygen in the one case or the consumption of the gas in the other, brought about by the oxidation of certain constituents of the liquor and the presence of vapor from the liquor in the remaining air or gas. This vitiated air or gas is removed from the vessel by opening the cock $k$, it being at a temperature considerably above that of the exterior air. It rapidly passes out of the open cock and its place is taken by air or gas admitted to the vessel through the tap $t$. The air or gas formed in the vessel should fill the space above the liquor and exert a pressure of from five to ten pounds to the square inch.

The spraying of the liquor is continued until the required "age" is reached. The continuance of the treatment depends upon the age, as the improvement or change of quality known as "aging" proceeds as long as the action of the air or gas on the particles of liquor is maintained. To reach the point where the liquor is improved to the highest degree possible, the treatment must be continued until every particle of the liquor has been exposed to the action of the air or gas in the presence of heat. This is the theory of the process; practically, the time of treatment depends upon what age is required. I find by experiment that twenty days, or thereabout, produces the improvement generally obtained by storage for about one year, when atmospheric air is used; but when oxygen gas is substituted for the air the time required for producing the same effect is shorter.

I claim—

In the treatment of liquors for the purpose of aging them, the process herein described, the same consisting in confining the liquor to prevent the vapors from escaping, protecting the liquor against injury by contact with the walls of the containing-vessel by means of an interposed layer of carbon, the said carbon also serving as the purifying and coloring agent, heating the confined liquor, spraying, vaporizing, or otherwise finely dividing it, and subjecting the liquor so confined, heated, and divided to the action of oxygen gas.

In testimony that I claim the foregoing as my invention I have hereunto subscribed my name this 8th day of August, 1887.

JULIAN A. H. HASBROUCK.

In presence of—
  WILTON C. DONN,
  LILLIE J. SMITH.